(12) United States Patent
Worrell

(10) Patent No.: US 9,667,446 B2
(45) Date of Patent: May 30, 2017

(54) CONDITION CODE APPROACH FOR COMPARING RULE AND PACKET DATA THAT ARE PROVIDED IN PORTIONS

(71) Applicant: CAVIUM, INC., San Jose, CA (US)

(72) Inventor: Frank Worrell, San Jose, CA (US)

(73) Assignee: CAVIUM, INC., San Jose, CA (US)

( * ) Notice: Subject to any disclaimer, the term of this patent is extended or adjusted under 35 U.S.C. 154(b) by 727 days.

(21) Appl. No.: 14/150,761

(22) Filed: Jan. 8, 2014

(65) Prior Publication Data
US 2015/0193689 A1    Jul. 9, 2015

(51) Int. Cl.
*H04L 12/50* (2006.01)
*H04L 12/64* (2006.01)

(52) U.S. Cl.
CPC ................ *H04L 12/6418* (2013.01)

(58) Field of Classification Search
CPC .................................................. H04L 12/006
USPC ............................................... 370/329
See application file for complete search history.

(56) References Cited

U.S. PATENT DOCUMENTS

| | | | |
|---|---|---|---|
| 5,107,361 A | 4/1992 | Kneidinger et al. | |
| 5,214,653 A | 5/1993 | Elliott et al. | |
| 5,463,777 A | 10/1995 | Bialkowski et al. | |
| 5,584,026 A | 12/1996 | Knudsen et al. | |
| 5,682,535 A | 10/1997 | Knudsen | |
| 5,893,142 A | 4/1999 | Moyer et al. | |
| 5,893,911 A | 4/1999 | Piskiel et al. | |
| 6,212,184 B1 | 4/2001 | Venkatachary et al. | |
| 6,233,575 B1 | 5/2001 | Agrawal et al. | |
| 6,298,340 B1 | 10/2001 | Calvignac et al. | |
| 6,341,130 B1 | 1/2002 | Lakshman et al. | |
| 6,467,019 B1 | 10/2002 | Washburn | |
| 6,473,763 B1 | 10/2002 | Corl et al. | |

(Continued)

FOREIGN PATENT DOCUMENTS

EP     2 276 217 A2    1/2011
WO    2004/013777 A1   2/2004
(Continued)

OTHER PUBLICATIONS

Abdelghani et al. (2005) "Packet Classification Using Adaptive Rule Cutting," In; The IEEE Proc. of Adv. Indus. Conf. on Telecom. pp. 28-33.

(Continued)

*Primary Examiner* — Dang Ton
(74) *Attorney, Agent, or Firm* — Brown Rudnick LLP; Weber Hsiao

(57) ABSTRACT

A condition code approach for comparing dimension match data of a rule with corresponding data in a key is provided. The approach includes, given dimension match data divided into first and second portions, comparing the first portion with a corresponding first portion of data in a key and setting a first condition code based on the comparison. The approach further includes comparing the second portion with a corresponding second portion of key data and setting a second condition code based on the comparison. The approach further includes determining whether the dimension match data is equal to, greater than, or less than the corresponding data in the key based on the first and second condition codes, and returning a response indicating whether the data matches based on the determination.

11 Claims, 15 Drawing Sheets

(56) References Cited

U.S. PATENT DOCUMENTS

| | | |
|---|---|---|
| 6,476,763 B2 | 11/2002 | Allen |
| 6,510,509 B1 | 1/2003 | Chopra et al. |
| 6,539,394 B1 | 3/2003 | Calvignac et al. |
| 6,567,408 B1 | 5/2003 | Li et al. |
| 6,587,466 B1 | 7/2003 | Bhattacharya et al. |
| 6,636,480 B1 | 10/2003 | Walia et al. |
| 6,658,002 B1 | 12/2003 | Ross et al. |
| 6,735,600 B1 | 5/2004 | Andreev |
| 6,868,414 B2 | 3/2005 | Khanna et al. |
| 6,918,031 B2 | 7/2005 | Wilson |
| 6,980,555 B2 | 12/2005 | Mar |
| 7,039,641 B2 | 5/2006 | Woo |
| 7,046,848 B1 | 5/2006 | Olcott |
| 7,110,407 B1 | 9/2006 | Khanna |
| 7,133,409 B1 | 11/2006 | Willardson |
| 7,225,188 B1 | 5/2007 | Gai et al. |
| 7,260,558 B1 | 8/2007 | Cheng et al. |
| 7,350,040 B2 | 3/2008 | Marinescu |
| 7,366,728 B2 | 4/2008 | Corl et al. |
| 7,370,361 B2 | 5/2008 | de los Santos et al. |
| 7,392,349 B1 | 6/2008 | Mathur et al. |
| 7,415,472 B2 | 8/2008 | Testa |
| 7,441,022 B1 | 10/2008 | Schuba et al. |
| 7,509,300 B2 | 3/2009 | Sahni et al. |
| 7,536,476 B1 | 5/2009 | Alleyne |
| 7,546,234 B1 | 6/2009 | Deb et al. |
| 7,571,156 B1 | 8/2009 | Gupta et al. |
| 7,594,081 B2 | 9/2009 | Bouchard et al. |
| 7,613,926 B2 | 11/2009 | Edery et al. |
| 7,634,408 B1 | 12/2009 | Mohri |
| 7,636,717 B1 | 12/2009 | Gupta et al. |
| 7,702,629 B2 | 4/2010 | Cytron et al. |
| 7,710,988 B1 | 5/2010 | Tripathi et al. |
| 7,711,893 B1 | 5/2010 | Venkatachary |
| 7,761,890 B1 | 7/2010 | Harvey et al. |
| 7,870,161 B2 | 1/2011 | Wang |
| 7,873,992 B1 | 1/2011 | Daily et al. |
| 7,937,355 B2 | 5/2011 | Corl et al. |
| 7,949,683 B2 | 5/2011 | Goyal |
| 7,962,434 B2 | 6/2011 | Estan et al. |
| 7,990,893 B1 | 8/2011 | Singh |
| 7,992,169 B1 | 8/2011 | Harvey et al. |
| 8,005,869 B2 | 8/2011 | Corl et al. |
| 8,015,085 B2 | 9/2011 | Srinivasan et al. |
| 8,024,802 B1 | 9/2011 | Preston |
| 8,051,085 B1 | 11/2011 | Srinivasan et al. |
| 8,111,697 B1 | 2/2012 | Panwar et al. |
| 8,156,507 B2 | 4/2012 | Brjazovski et al. |
| 8,165,125 B2 | 4/2012 | Kim et al. |
| 8,180,803 B2 | 5/2012 | Goyal |
| 8,301,788 B2 | 10/2012 | Bouchard et al. |
| 8,352,391 B1 | 1/2013 | Kapadia |
| 8,392,590 B2 | 3/2013 | Bouchard et al. |
| 8,407,794 B2 | 3/2013 | Kim et al. |
| 8,447,120 B2 | 5/2013 | Ji et al. |
| 8,473,523 B2 | 6/2013 | Goyal |
| 8,477,611 B2 | 7/2013 | Lim |
| 8,543,528 B2 | 9/2013 | Lunteren |
| 8,554,698 B2 | 10/2013 | Bando et al. |
| 8,566,344 B2 | 10/2013 | Bando et al. |
| 8,800,021 B1 | 8/2014 | Swaminathan et al. |
| 8,856,203 B1 | 10/2014 | Schelp et al. |
| 8,934,488 B2 | 1/2015 | Goyal et al. |
| 8,937,952 B2 | 1/2015 | Goyal et al. |
| 8,937,954 B2 | 1/2015 | Goyal et al. |
| 8,990,259 B2 | 3/2015 | Billa et al. |
| 9,137,340 B2 | 9/2015 | Goyal et al. |
| 9,183,244 B2 | 11/2015 | Bullis et al. |
| 9,344,366 B2 | 5/2016 | Bouchard et al. |
| 2001/0006520 A1 | 7/2001 | Moulsley et al. |
| 2002/0023089 A1 | 2/2002 | Woo |
| 2003/0005144 A1 | 1/2003 | Engel et al. |
| 2003/0028674 A1 | 2/2003 | Boden |
| 2003/0108043 A1 | 6/2003 | Liao |
| 2003/0126272 A1 | 7/2003 | Cori et al. |
| 2003/0156586 A1 | 8/2003 | Lee et al. |
| 2003/0223421 A1 | 12/2003 | Rich et al. |
| 2004/0006668 A1 | 1/2004 | Park et al. |
| 2004/0158744 A1 | 8/2004 | Deng et al. |
| 2004/0162826 A1 | 8/2004 | Wyschogrod et al. |
| 2004/0172234 A1 | 9/2004 | Dapp et al. |
| 2004/0193563 A1 | 9/2004 | Hagelin |
| 2004/0225999 A1 | 11/2004 | Nuss |
| 2004/0258067 A1 | 12/2004 | Irish et al. |
| 2004/0264384 A1 | 12/2004 | Deval et al. |
| 2005/0013293 A1 | 1/2005 | Sahita |
| 2005/0028114 A1 | 2/2005 | Gould et al. |
| 2005/0035784 A1 | 2/2005 | Gould et al. |
| 2005/0157641 A1 | 7/2005 | Roy |
| 2005/0177736 A1 | 8/2005 | de los Santos et al. |
| 2005/0238010 A1 | 10/2005 | Panigrahy et al. |
| 2005/0240604 A1 | 10/2005 | Corl et al. |
| 2005/0278781 A1 | 12/2005 | Zhao et al. |
| 2006/0002386 A1 | 1/2006 | Yik et al. |
| 2006/0026138 A1 | 2/2006 | Robertson et al. |
| 2006/0029104 A1 | 2/2006 | Jungck |
| 2006/0039372 A1 | 2/2006 | Sarkinen et al. |
| 2006/0059165 A1 | 3/2006 | Bosloy et al. |
| 2006/0059314 A1 | 3/2006 | Bouchard et al. |
| 2006/0069872 A1 | 3/2006 | Bouchard et al. |
| 2006/0075206 A1 | 4/2006 | Bouchard et al. |
| 2006/0085533 A1 | 4/2006 | Hussain et al. |
| 2006/0101195 A1 | 5/2006 | Jain |
| 2006/0130142 A1 | 6/2006 | Mester et al. |
| 2006/0136570 A1 | 6/2006 | Pandya |
| 2006/0155915 A1 | 7/2006 | Pereira |
| 2006/0288024 A1 | 12/2006 | Braica |
| 2007/0011734 A1 | 1/2007 | Balakrishnan et al. |
| 2007/0115966 A1 | 5/2007 | Tzeng |
| 2007/0168377 A1 | 7/2007 | Zabarsky |
| 2007/0192863 A1 | 8/2007 | Kapoor et al. |
| 2007/0240229 A1 | 10/2007 | Yoon et al. |
| 2008/0031258 A1 | 2/2008 | Acharya et al. |
| 2008/0034427 A1 | 2/2008 | Cadambi et al. |
| 2008/0059464 A1 | 3/2008 | Law et al. |
| 2008/0071783 A1 | 3/2008 | Langmead et al. |
| 2008/0082946 A1 | 4/2008 | Zilic et al. |
| 2008/0097959 A1 | 4/2008 | Chen et al. |
| 2008/0101371 A1 | 5/2008 | Law et al. |
| 2008/0109392 A1 | 5/2008 | Nandy |
| 2008/0109431 A1 | 5/2008 | Kori |
| 2008/0140600 A1 | 6/2008 | Pandya |
| 2008/0140631 A1 | 6/2008 | Pandya |
| 2008/0209540 A1 | 8/2008 | Deng et al. |
| 2008/0229415 A1 | 9/2008 | Kapoor et al. |
| 2008/0262991 A1 | 10/2008 | Kapoor et al. |
| 2008/0270833 A1 | 10/2008 | McMillen et al. |
| 2008/0271147 A1 | 10/2008 | Mohanan et al. |
| 2008/0310440 A1 | 12/2008 | Chen et al. |
| 2009/0006847 A1 | 1/2009 | Abzarian et al. |
| 2009/0034530 A1 | 2/2009 | Basso et al. |
| 2009/0063825 A1 | 3/2009 | McMillen et al. |
| 2009/0119279 A1 | 5/2009 | Goyal et al. |
| 2009/0119399 A1 | 5/2009 | Hussain et al. |
| 2009/0125470 A1 | 5/2009 | Shah et al. |
| 2009/0138440 A1 | 5/2009 | Goyal |
| 2009/0138494 A1 | 5/2009 | Goyal |
| 2009/0185568 A1 | 7/2009 | Cho et al. |
| 2009/0217341 A1 | 8/2009 | Sun et al. |
| 2009/0262659 A1 | 10/2009 | Sturges et al. |
| 2009/0274384 A1 | 11/2009 | Jakobovits |
| 2009/0323383 A1 | 12/2009 | Mondaeev et al. |
| 2010/0034202 A1 | 2/2010 | Lu et al. |
| 2010/0037056 A1 | 2/2010 | Follis et al. |
| 2010/0067535 A1 | 3/2010 | Ma et al. |
| 2010/0094906 A1 | 4/2010 | Della-Libera et al. |
| 2010/0095162 A1 | 4/2010 | Inakoshi |
| 2010/0110936 A1 | 5/2010 | Bailey et al. |
| 2010/0114973 A1 | 5/2010 | Goyal |
| 2010/0146623 A1 | 6/2010 | Namjoshi et al. |
| 2010/0153326 A1 | 6/2010 | Bernardes et al. |
| 2010/0153420 A1 | 6/2010 | Yang et al. |
| 2010/0158394 A1 | 6/2010 | Chang et al. |
| 2010/0175124 A1 | 7/2010 | Miranda |

(56) References Cited

U.S. PATENT DOCUMENTS

| | | |
|---|---|---|
| 2010/0192225 A1 | 7/2010 | Ma et al. |
| 2010/0199355 A1 | 8/2010 | Ouddan et al. |
| 2010/0281532 A1 | 11/2010 | Deng et al. |
| 2011/0016154 A1 | 1/2011 | Goyal et al. |
| 2011/0038375 A1 | 2/2011 | Liu et al. |
| 2011/0090842 A1 | 4/2011 | Hirano et al. |
| 2011/0093484 A1 | 4/2011 | Bando et al. |
| 2011/0093496 A1 | 4/2011 | Bando et al. |
| 2011/0113191 A1 | 5/2011 | Pandya |
| 2011/0119440 A1 | 5/2011 | Pandya |
| 2011/0137930 A1 | 6/2011 | Hao et al. |
| 2011/0173149 A1 | 7/2011 | Schon |
| 2011/0173490 A1 | 7/2011 | Narayanaswamy et al. |
| 2011/0185077 A1 | 7/2011 | Bremler-Barr et al. |
| 2011/0219010 A1 | 9/2011 | Lim |
| 2011/0238855 A1 | 9/2011 | Korsunsky et al. |
| 2011/0264822 A1 | 10/2011 | Ferguson et al. |
| 2011/0295779 A1 | 12/2011 | Chen et al. |
| 2012/0017262 A1 | 1/2012 | Kapoor et al. |
| 2012/0078832 A1 | 3/2012 | Lunteren |
| 2012/0143854 A1 | 6/2012 | Goyal et al. |
| 2012/0203718 A1 | 8/2012 | Biran et al. |
| 2012/0215569 A1 | 8/2012 | Bauchot et al. |
| 2012/0221494 A1 | 8/2012 | Pasetto et al. |
| 2012/0221497 A1 | 8/2012 | Goyal et al. |
| 2012/0311529 A1 | 12/2012 | Beveridge et al. |
| 2012/0331007 A1 | 12/2012 | Billa et al. |
| 2012/0331554 A1 | 12/2012 | Goyal et al. |
| 2013/0034100 A1 | 2/2013 | Goyal et al. |
| 2013/0034106 A1 | 2/2013 | Goyal et al. |
| 2013/0036083 A1 | 2/2013 | Goyal |
| 2013/0036102 A1 | 2/2013 | Goyal et al. |
| 2013/0036471 A1 | 2/2013 | Bouchard et al. |
| 2013/0036477 A1 | 2/2013 | Goyal |
| 2013/0039366 A1 | 2/2013 | Goyal et al. |
| 2013/0060727 A1 | 3/2013 | Goyal et al. |
| 2013/0070753 A1 | 3/2013 | Sahni et al. |
| 2013/0085978 A1 | 4/2013 | Goyal et al. |
| 2013/0133064 A1 | 5/2013 | Goyal et al. |
| 2013/0191916 A1 | 7/2013 | Yao et al. |
| 2013/0212484 A1* | 8/2013 | Joshi ............... G06F 9/541 715/740 |
| 2013/0218853 A1 | 8/2013 | Bullis et al. |
| 2013/0232104 A1 | 9/2013 | Goyal et al. |
| 2013/0282766 A1 | 10/2013 | Goyal et al. |
| 2014/0079063 A1 | 3/2014 | Edsall et al. |
| 2014/0214749 A1 | 7/2014 | Ruehle |
| 2014/0229386 A1 | 8/2014 | Tervo et al. |
| 2014/0279850 A1 | 9/2014 | Goyal et al. |
| 2014/0280357 A1 | 9/2014 | Billa et al. |
| 2014/0281809 A1 | 9/2014 | Billa et al. |
| 2015/0066927 A1 | 3/2015 | Goyal et al. |
| 2015/0067123 A1 | 3/2015 | Goyal et al. |
| 2015/0067200 A1 | 3/2015 | Goyal et al. |
| 2015/0067776 A1 | 3/2015 | Billa et al. |
| 2015/0067836 A1 | 3/2015 | Billa et al. |
| 2015/0117461 A1 | 4/2015 | Goyal et al. |
| 2015/0186786 A1 | 7/2015 | Goyal et al. |
| 2015/0189046 A1 | 7/2015 | Worrell et al. |
| 2015/0193689 A1 | 7/2015 | Worrell |
| 2015/0220454 A1 | 8/2015 | Goyal et al. |
| 2015/0220845 A1 | 8/2015 | Goyal et al. |
| 2016/0248739 A1 | 8/2016 | Bouchard et al. |

FOREIGN PATENT DOCUMENTS

| | | |
|---|---|---|
| WO | 2007/109445 A1 | 9/2007 |
| WO | 2008/005772 A2 | 1/2008 |
| WO | 2009/145712 A1 | 12/2009 |
| WO | 2012/177736 A1 | 12/2012 |
| WO | 2012/177752 A1 | 12/2012 |
| WO | 2013/020002 A1 | 2/2013 |
| WO | 2013/020003 A1 | 2/2013 |
| WO | 2013/078053 A1 | 5/2013 |

OTHER PUBLICATIONS

Aho et al. (1977) Ch. 3 In; Principles of Compiler Design. Addison-Wesley. pp. 73-124.

Baboescu et al. (2001) "Scalable Packet Classification," In; The Proceedings of the ACM SIGCOMM '01 Conference on Applications, Technologies, Architectures, and Protocols for Computer Communication. pp. 199-210.

Baboescu et al. (2003) "Packet Classification for Core Routers: Is there an alternative to CAMs?" In; The Twenty-Second Annual Joint Conference of the IEEE Computer and Communications, INFOCOM 2003. vol. 1. pp. 53-63.

Becchi et al (2008) "Extending Finite Automata to Efficiently Match Perl-compatible Regular Expressions," In; The Proceedings of the 2008 CoNext Conference. Dec. 9-12, 2008.

Becchi et al. (2007) "A Hybrid Finite Automaton for Practical Deep Packet Inspection," In; The Proceedings of the International Conference on emerging Networking EXperiments and Technologies (CoNEXT), New York, New York. Dec. 2007.

Becchi et al. (2009) "Data Structures, Algorithms and Architechtures for Efficient Regular Expression Evaluation," Washington University. Dissertation for the degree of Doctor of Philosophy. Saint Louis, Missouri.

Branch et al. (2002) "Denial of Service Intrusion Detection Using Time Dependent Deterministic Finite Automata," In; The Proc. Research Conference, Troy, NY, Oct. 2002.

Chodnicki (2011) "An Introduction to Regular Expressions/Adventures with Open Source BI," Adventures with Open Source BI. Accessible on the Internet at URL: available at http://type-exit.org/adventures-with-open-source-bi/2011/05/an-introduction-to-regular-expressions. [Last Accessed Aug. 21, 2015].

Faro et al. (2008) "Efficient Variants of the Backward-Oracle-Matching Algorithm," In; The Proceedings of Prague Stringology Conference, 2008, pp. 146-160.

Gupta et al. (1999) "Packet Classification on Multiple Fields," In; The Proceedings of SIGCOMM '99 Conference on Applications, Technologies, Architectures, and Protocols for Computer Communication (SIGCOMM '99). pp. 147-160.

Gupta et al. (2000) "Classifying Packets With Hierarchical Intelligent Cuttings," IEEE Micro. 20(1):34-41.

Gupta (2000) "Algorithms for Packet Routing Lookups and Packet Classification," Stanford University. Dissertation for be degree of Doctor of Philosophy.

Hoperoft et al. (1979) Ch. 2 In; Introduction to Automata Theory, Languages, and Computation. Addison-Wesley. Reading, Massachusetts.

Wikipedia "Access control list," Wikimedia Foundation, Inc. Accessible on the Internet at URL: https://en.wikipedia.org/wiki/Access_control_list. [Last Accessed Aug. 21, 2015].

Klarlund (1992) "Progress Measures, Immediate Determinacy, and a Subset Construction for Tree Automata," In; The Proceedings of the Seventh Annual IEEE Symposium on Logic in Computer Science, 1992. LICS '92. pp. 382-393.

Navarro (2001) "NR-grep: A Fast and Flexible Pattern Matching Tool," Software Practice and Experience (SPE). 31:1265-1312.

Navarro (2004) "Pattern Matching," Journal of Applied Statistics. 31(8):925-949.

Pong et al. (2011) "HARP: Rapid Packet Classification via Hashing Round-Down Prefixes," IEEE Transactions on Parallel and Distributed Systems. 22(7):1105-1119.

Qi et al. (2009) "Packet Classification Algorithms: From Theory to Practice," In; The Proceedings of the 28th IEEE conference on Computer Communications (INFOCOM '09). pp. 648-656.

Rabin et al. (1959) "Finite Automata and their Decision Problems," IBM Journal of Research and Development. 3(2):114-125.

Singh (2002)"Regular Expressions," Seeing With C. Accessible on th Internet at URL: http://www.seeingwithc.org/topic7html.html. [Last Accessed Aug. 24, 2014].

Singh et al. (2003) "Packet Classification Using Multidimensional Cutting," In; The Proceedings of the ACMSIGCOMM 03 Conference on Applications, Technologies, Architectures, and Protocols for Computer Communication (SIGCOMM 03). pp. 213-224.

(56) References Cited

OTHER PUBLICATIONS

Sipser (1997) "Introduction to the Theory of Computation," PWS Nondeterminism. Section 1.2 pp. 47-63.
Sun et al. (2008) "HFilter: Hybrid Finite Automaton Based Stream Filtering for Deep and Recursive XML Data," Database and Expert Systems Applications Lecture Notes in Computer Science. 5181:566-580.
Theiling (2001) "Generating Decision Trees for Decoding Binaries" In; The OM '01 Proceedings of the 2001 ACM SIGPLAN workshop on Optimization of middleware and distributed systems. pp. 112-120.
Yu et al. (2006) "A Novel IP Packet Classification Algorithm Based on Hierarchical Intelligent Cuttings," In; The Proceedings of the IEEE 6th International Conference on ITS Telecom. pp. 1033-1036.
Zhang et al. (2010) "On Constructing Efficient Shared Decision Trees for Multiple Packet Filters," In; IEEE INFOCOM'10. San Diego, California.
International Search Report with Written Opinion corresponding to International Patent Application No. PCT/US2012/043307, mailed Dec. 6, 2012.
International Search Report with Written Opinion corresponding to International Patent Application No. PCT/US2012/049406, mailed Oct. 18, 2010.
Office Action corresponding to U.S. Appl. No. 13/168,395, mailed Apr. 20, 2015.
Office Action corresponding to U.S. Appl. No. 13/168,395, mailed Dec. 24, 2014.
Office Action corresponding to U.S. Appl. No. 13/168,395, mailed Dec. 27, 2013.
Office Action corresponding to U.S. Appl. No. 13/168,395, mailed Jun. 10, 2014.
Office Action corresponding to U.S. Appl. No. 13/168,450, mailed Apr. 25, 2013.
Office Action corresponding to U.S. Appl. No. 13/168,450, mailed Feb. 28, 2014.
Office Action corresponding to U.S. Appl. No. 13/168,450, mailed Jun. 6, 2014.
Office Action corresponding to U.S. Appl. No. 13/168,450, mailed Oct. 8, 2014.
Office Action corresponding to U.S. Appl. No. 13/565,775, mailed Aug. 26, 2014.
Office Action corresponding to U.S. Appl. No. 13/565,775, mailed Feb. 9, 2015.
Office Action corresponding to U.S. Appl. No. 13/831,191, mailed Dec. 12, 2014.
Office Action corresponding to U.S. Appl. No. 13/831,191, mailed May 21, 2015.
Office Action corresponding to U.S. Appl. No. 13/831,232, mailed Nov. 21, 2014.
Office Action corresponding to U.S. Appl. No. 13/831,415, mailed Dec. 18, 2014.
Office Action corresponding to U.S. Appl. No. 13/831,415, mailed Jun. 4, 2015.
Office Action corresponding to U.S. Appl. No. 14/145,918, mailed Aug. 19, 2016.
Office Action corresponding to U.S. Appl. No. 14/145,918, mailed Jan. 26, 2016.

\* cited by examiner

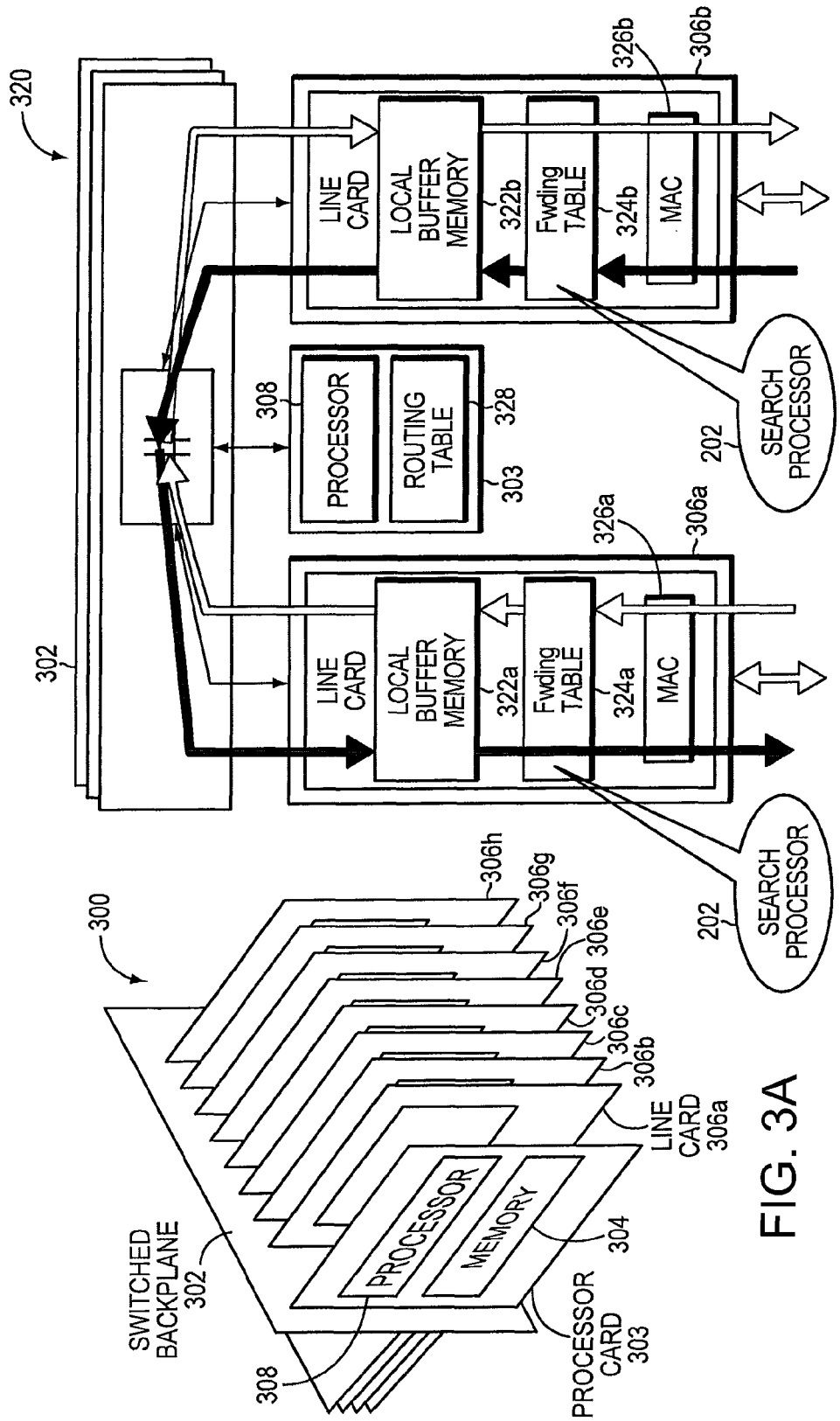

Cycle - 1

Cycle - 2

| Cycle - 1 | Cycle - 2 | Cycle - 3 |
|---|---|---|
| K: 1 1 1 1 | 0 0 0 0 | 0 1 0 0 |
| R: 1 1 1 1 | 0 0 0 0 | 1 1 1 1 |
| 1 - CC = EQ | 2 - CC = EQ | 3 - CC = GT |

P - CC = I - CC Combine 2 - CC

= EQ and EQ

= EQ

Determination = P - CC Combine 3 - CC

= EQ and GT

Cycle - 1

(K)ey = 0 0 0 1

(R)ule = 0 0 0 0

1 - CC = LT

Cycle - 2

- - - -

- - - -

2 - CC = LT

- Don't Care Bits

Determination
= LT

FIG. 9A

Cycle - 1

K = 0 0 0 1

R = 0 0 0 0

1 - CC = GT

Cycle - 2

- - - -

- - - -

2 - CC = GT

Determination
= GT

FIG. 9B

Cycle - 1

K = 0 0 0 0

R = 0 0 0 0

1 - CC = EQ

Cycle - 2

K = 0 0 1 0

R = 0 0 0 0

2 - CC = LT

Determination
= LT

FIG. 9C

| Cycle - 1 | Cycle - 2 | |
|---|---|---|
| K = 0 1 0 0 | 0 1 0 0 | |
| R = 0 1 0 0 | 1 1 1 1 | Determination = GT |
| 1 - CC = EQ | 2 - CC = GT | |

FIG. 9D

| Cycle - 1 | Cycle - 2 | |
|---|---|---|
| K = 1 1 1 1 | K = 0 0 0 0 | |
| R = 1 1 1 1 | R = 0 0 0 0 | Determination = EQ |
| 1 - CC = EQ | 2 - CC = EQ | |

FIG. 9E

Condition Code (CC)

| 1st Bit (1005) | 2nd Bit (1010) | CC (1000) |
|---|---|---|
| 1 | 0 | EQ |
| 0 | 1 | LT |
| 0 | 0 | GT |

FIG. 10

Range Match (1100)

| 7 | 6 | 5 | 4 | 3 | 2 | 1 | 0 | bit |
|---|---|---|---|---|---|---|---|---|
| 0 | 1 | 0 | 1 | 0 | 1 | 0 | 1 | |
| 0 | 1 | 0 | 1 | 1 | 0 | 1 | 0 | |

Minimum Value (1105):

Minimum Value (1110):

Interleveled Minimum / Maximum Value (1115):  0 1 0 1   0 1 0 1   0 1 0 1   1 0 1 0

Key:  $\underbrace{0\ 1\ 0\ 1}_{1120a}$   $\underbrace{1\ 0\ 1\ 0}_{1120b}$

FIG. 11A

Cycle - 1

1st Portion Of Key (1120a) : 0 1 0 1

1 - Rule Data - LO : 0 1 0 1

1 - Rule Data - HI : 0 1 0 1

CYCLE - 2

2nd Portion of Key (1120b) : 1 0 1 0

2 - Rule Data - LO : 0 1 0 1

2 - Rule Data - HI : 1 0 1 0

---

2 - CC - LO = LT

2 - CC - HI = EQ

---

Determination for Minimum Value = 1 - CC - LO  Combine  2 - CC - LO

= EQ and LT

= LT

Determination for Maximum Value = 1 - CC - HI  Combine  2 - CC - HI

= EQ and EQ

Mask Match (1200)

| | | |
|---|---|---|
| Value (1205) | 0 1 0 1 | 1 0 1 0 |
| Mask (1210) | 1 1 1 1 | 1 1 0 0 |
| Key (1215) | 0 1 0 1 | 1 0 0 1 |
| | 1215a | 1215b |

Cycle - 1

| | |
|---|---|
| 1st Portion of Value (1205a) | 0 1 0 1 |
| 1st Portion of Mask (1210a) | 1 1 1 1 |
| Masked 1st Portion of Value (1220a) | 0 1 0 1 |
| Masked 1st Portion of Key (1225a) | 0 1 0 1 |

Cycle - 2

| | |
|---|---|
| 2nd Portion of Value (1205b) | 1 0 1 0 |
| 2nd Portion of Mask (1210b) | 1 1 0 0 |
| Masked 2nd Portion of Value (1220b) | 1 0 0 0 |
| Masked 2nd Portion of Key (1225b) | 1 0 0 0 |

2 - CC = EQ

Determination (1230) = 1 - CC  2 - CC
= EQ  AND  EQ
= EQ ⇒ MATCH

FIG. 12B

CONDITION CODE APPROACH FOR COMPARING RULE AND PACKET DATA THAT ARE PROVIDED IN PORTIONS

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

A classifier, using a set of filters or rules, specifies the flows, or classes. For example, each rule in a firewall might specify a set of source and destination addresses and associate a corresponding deny or permit action with it. Alternatively, the rules might be based on several fields of a packet header including layers 2, 3, 4, and 5 of the OSI model, which contain addressing and protocol information.

On some types of proprietary hardware, an Access Control List (ACL) refers to rules that are applied to port numbers or network daemon names that are available on a host or layer 3 devices, each with a list of hosts and/or networks permitted to use a service. Both individual servers as well as routers can have network ACLs. ACLs can be configured to control both inbound and outbound traffic.

SUMMARY

In accordance with an example, a method for comparing dimension match data of a rule with corresponding data in a key is provided. The method includes, in a rule match engine provided with dimension match data divided into a first portion and a second portion, comparing the first portion of the dimension match data with a corresponding first portion of data in a key. The method further includes setting a first condition code to equal to, greater than, or less than based on the comparison of the first portion of the dimension match data with the corresponding first portion of data in the key. The method further includes comparing the second portion of the dimension match data with a corresponding second portion of data in the key and setting a second condition code to equal to, greater than, or less than based on the comparison of the second portion of the dimension match data with the corresponding second portion of data in the key. The method further includes determining whether the dimension match data is equal to, greater than, or less than the corresponding data in the key based on the first and second condition codes and returning a response indicating whether the dimension match data and the corresponding data in the key match based on the determination.

In accordance with another example, a system for comparing dimension match data of a rule with corresponding data in a key is provided. The system includes memory and at least one interface for receiving dimension match data divided into a first portion and a second portion. The system further includes a rule match engine communicatively coupled to the memory and the at least one interface. The rule match engine is configured to compare the first portion of the dimension match data with a corresponding first portion of data in a key and set a first condition code to equal to, greater than, or less than based on the comparison of the first portion of the dimension match data with the corresponding first portion of data in the key. The rule match engine is further configured to compare the second portion of the dimension match data with a corresponding second portion of data in the key and set a second condition code to equal to, greater than, or less than based on the comparison of the second portion of the dimension match data with the corresponding second portion of data in the key. The rule match engine is further configured to determine whether the dimension match data is equal to, greater than, or less than the corresponding data in the key based on the first and second condition codes return a response indicating whether the dimension match data and the corresponding data in the key match based on the determination.

In accordance with yet another example, a tangible computer-readable storage medium having computer readable instructions stored therein for comparing dimension match data of a rule with corresponding data in a key is provided. The computer readable instructions when executed by a rule matching engine, provided with dimension match data divided into a first portion and a second portion, cause the rule match engine to compare the first portion of the dimension match data with a corresponding first portion of data in a key. The rule match engine further caused to set a first condition code to equal to, greater than, or less than based on the comparison of the first portion of the dimension match data with the corresponding first portion of data in the key. The rule match engine further caused to compare the second portion of the dimension match data with a corresponding second portion of data in the key and to set a second condition code to equal to, greater than, or less than based on the comparison of the second portion of the dimension match data with the corresponding second portion of data in the key. The rule match engine further caused to determine whether the dimension match data is equal to, greater than, or less than the corresponding data in the key based on the first and second condition codes and to return a response indicating whether the dimension match data and the corresponding data in the key match based on the determination.

In some examples, any of the aspects above can include one or more of the following features.

In other examples of the method, given a minimum value and a maximum value of a range match that are interleaved into an interleaved minimum/maximum value, the method further includes comparing the first portion of the interleaved minimum/maximum value to the corresponding first portion of data in the key. The method still further includes setting a first condition code for the minimum value and a first condition code for the maximum value to equal to, greater than, or less than based on the comparison. The method further includes comparing the second portion of the interleaved minimum/maximum value to the corresponding second portion of data in the key, and setting a second condition code for the minimum value and a second condition code for the maximum value to equal to, greater than, or less than based on the comparison. The method still further includes determining whether the key is within the minimum and maximum values of the range match based on the first and second condition codes for the minimum value and the first and second condition codes for the maximum value.

In some examples of the method, each of the condition codes includes a first bit and a second bit. In these examples, setting a respective condition code includes setting the first and second bits forming a first value, a second value different than the first value or a third value different than the first and second values. The first, second, and third values correspond to equal to, greater than, and less than comparisons, respectively.

In other examples of the method, setting the first condition code further includes setting the first condition code to equal to, greater than, or less than based on the determination, the first condition code being a running condition code keeping a status of prior comparisons.

In some examples of the method, comparing the second portion of the dimension match data, further includes determining whether to compare the second portion of the dimension match data with the corresponding second portion of data in the key based on the setting of the first condition code. These examples further include, comparing the second portion of the dimension match data with the corresponding second portion of data in the key based on the determination In other examples of the method, determining includes, determining that the dimension match data and the corresponding data in the key are equal when the first and second condition codes are set to equal.

In some examples of the method, determining includes, determining the dimension match data is less than the corresponding data in the key when the first condition code is set to less than or when the first condition code is set to equal to and the second condition codes is set to less than.

In other examples of the method, determining includes, determining that the dimension match data is greater than the corresponding data in the key when the first condition code is set to greater than or when the first condition code is set to equal to and the second condition codes is set to greater than.

Another example of the method further includes, given a value and a mask of a mask match, each provided in a first portion and a second portion, applying the first portion of the mask to the first portion of the value and to the corresponding first portion of data in the key resulting in a masked first portion of the value and a masked corresponding first portion of data in the key, respectively. The method further includes comparing the masked first portion of the value to the masked corresponding first portion of data in the key, and setting a first condition code to equal to or not equal to based on the comparison. The method still further includes applying the second portion of the mask to the second portion of the value and to the corresponding second portion of data in the key resulting in a masked second portion of the value and a masked corresponding second portion of data in the key, respectively. The method further includes comparing the masked second portion of the value to the masked corresponding second portion of data in the key, and setting a second condition code to equal to or not equal to based on the comparison. The method still further includes determining whether the masked value is equal to or not equal to the masked corresponding data in the key based on the first and second condition codes, and returning a response indicating whether the masked value and the masked corresponding data in the key match based on the determination.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3A is a diagram of an example of a router architecture.

FIG. 3B is a block diagram of an example of a router employing a search processor.

FIG. 8 is a diagram showing an example of maintaining a running condition code.

FIGS. 9A-9E are diagrams showing examples of determining a result of a compare based on condition codes for partial compares.

FIG. 10 is a diagram of an example condition code for a partial compare.

FIGS. 11A-11C is a diagram of comparing an interleaved minimum/maximum value of a range match according to an example of the condition code approach.

FIGS. 12A and 12B is a diagram of applying an example of the condition code approach to a mask match.

DETAILED DESCRIPTION

Figure 1:
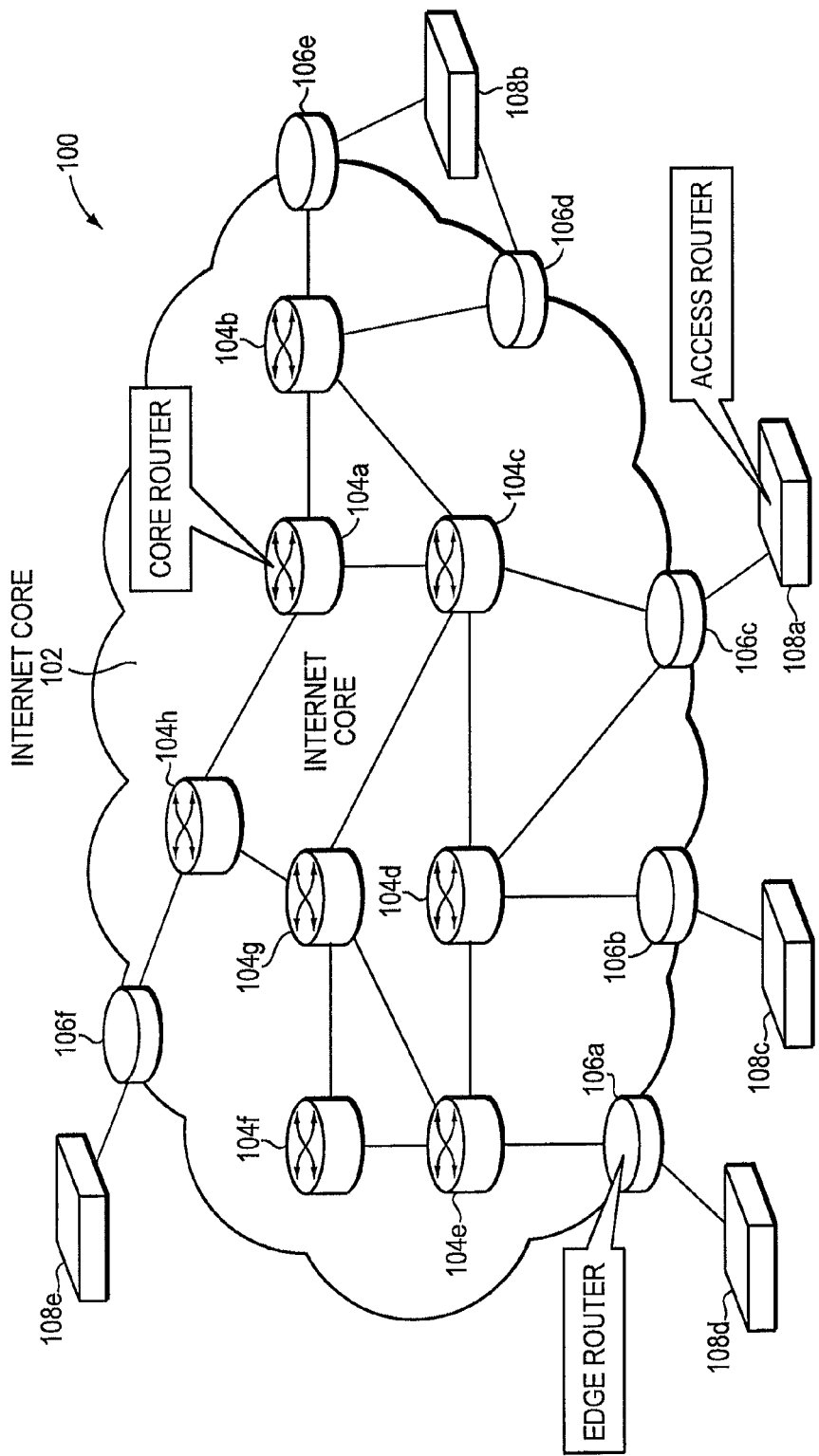
FIG. 1 is a block diagram of a typical network topology including network elements employing examples of a search processor described in this application.

FIG. 1 is a block diagram 100 of a typical network topology including network elements employing example of a search processor. The network topology includes an Internet core 102 including a plurality of core routers 104a-h. Each of the plurality of core routers 104a-h are connected to at least one other of the plurality of core routers 104a-h. Core routers 104a-h that are on the edge of the Internet core 102 (i.e., core routers 104b-e and 104h) are coupled with at least one edge router 106a-f. Each edge router 106a-f is coupled to at least one access router 108a-e.

The core routers 104a-h are configured to operate in the Internet core 102 or Internet backbone. The core routers 104a-h are configured to support multiple telecommunications interfaces of the Internet core 102 and are further configured to forward packets at a full speed of each of the multiple telecommunications protocols.

The edge routers 106a-f are placed at the edge of the Internet core 102. Edge routers 106a-f bridge access routers 108a-e outside the Internet core 102 and core routers 104a-h in the Internet core 102. Edge routers 106a-f can be configured to employ a bridging protocol to forward packets from access routers 108a-e to core routers 104a-h and vice versa.

The access routers 108a-e can be routers used by an end user, such as a home user or an office, to connect to one of the edge routers 106a-f, which in turn connects to the Internet core 102 by connecting to one of the core routers 104a-h. In this manner, the access routers 108a-e can connect to any other access router 108a-e via the edge routers 106a-f and the interconnected core routers 104a-h.

A search processor described herein can reside in any of the core routers 104a-h, edge routers 106a-f, and access routers 108a-e. The search processor described herein, within each of these routers, is configured to analyze Internet protocol (IP) packets based on a set of rules and forward the IP packets along an appropriate network path.

Figure 2A:
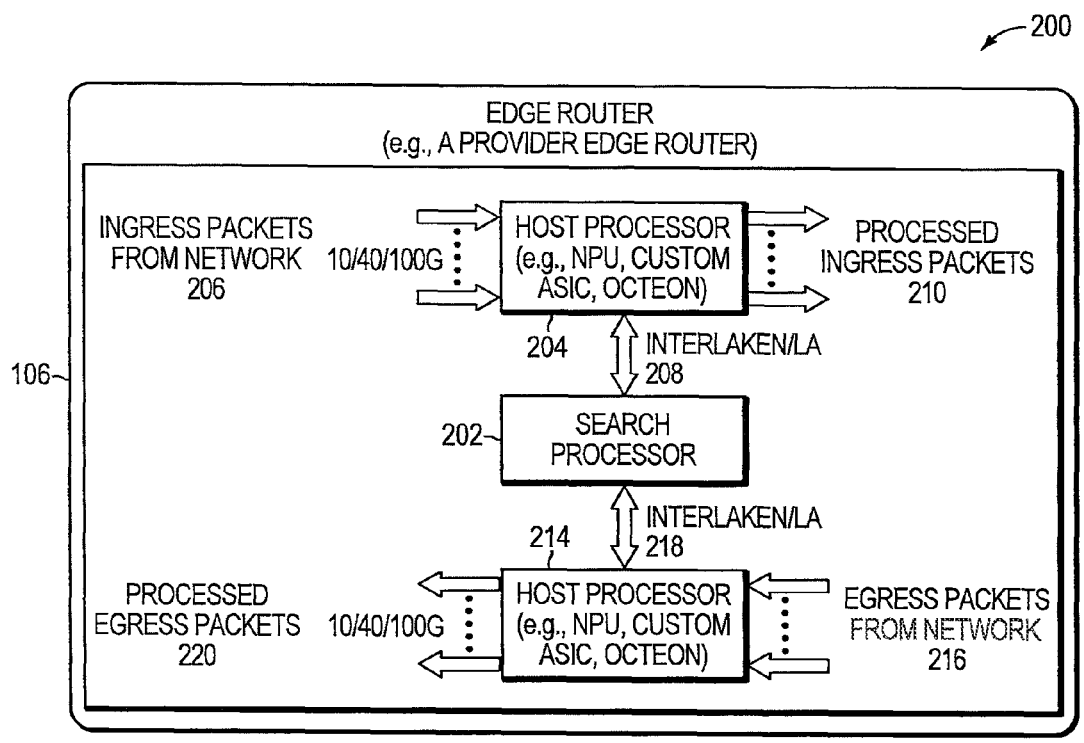
FIGS. 2A-2C are block diagrams illustrating examples of a search processor employed in routers.

FIG. 2A is a block diagram 200 illustrating an example embodiment of a search processor 202 employed in an edge router 106. An edge router 106, such as a provider edge router, includes the search processor 202, a first host processor 204 and a second host processor 214. The first host processor 204 is configured as an ingress host processor. The first host processor 204 receives ingress packets 206 from a network. The first host processor 204 forwards a lookup request including a packet header (or field) from the ingress packets 206 to the search processor 202 using an Interlaken interface 208. The search processor 202 then processes the packet header using a plurality of rule processing engines employing a plurality of rules to determine a path to forward the ingress packets 206 on the network. The search processor 202, after processing the lookup request with the packet header, forwards the path information to the first host processor 204, which forwards the processed ingress packets 210 to another network element in the network.

Likewise, the second host processor 214 is an egress host processor. The second host processor 214 receives egress packets to send from the network 216. The second host processor 214 forwards a lookup request with a packet header (or field) from the egress packets 216 to the search processor 202 over a second Interlaken interface 218. The search processor 202 then processes the packet header using a plurality of rule processing engines employing a plurality of rules to determine a path to forward the packets on the network. The second host processor 214 forwards the processed egress packets 220 to another network element in the network.

Figure 2B:
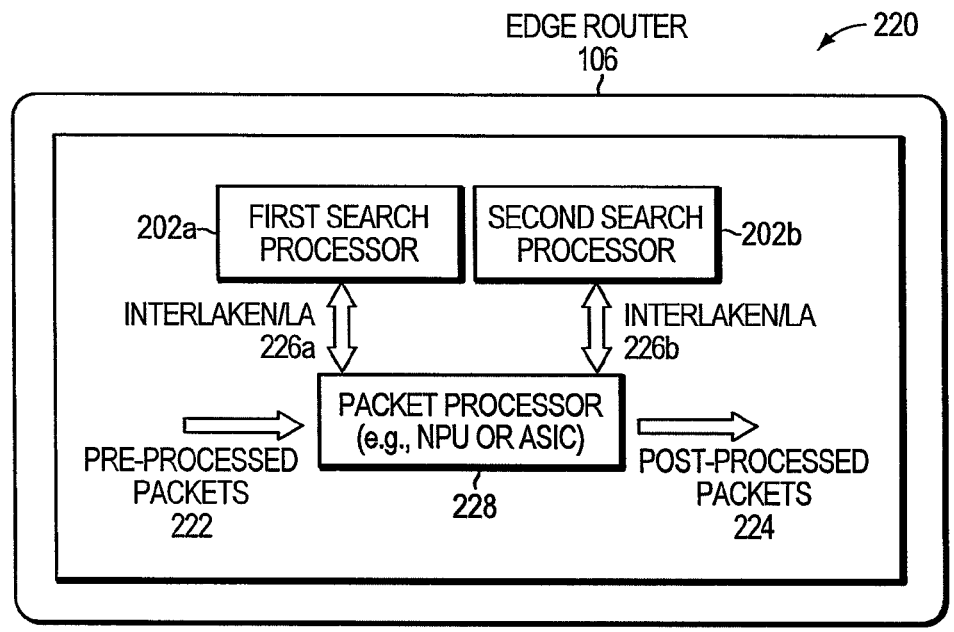

FIG. 2B is a block diagram 220 illustrating another example embodiment of an edge router 106 configured to employ the search processor 202. In this embodiment, the edge router 106 includes a plurality of search processors 202, for example, a first search processor 202a and a second search processor 202b. The plurality of search processors 202a-b are coupled to a packet processor 228 using a plurality of Interlaken interfaces 226a-b, respectively. The edge router 106 receives pre-processed packets 222 at the packet processor 228. The packet processor 228 forwards a lookup request (including packet header or particular fields from packet header) to one of the search processors 202a-b. One of the search processors 202a-b searches the packet headers for an appropriate forwarding destination for the pre-processed packets 222 based on a set of rules and data within the packet header, and responds to the lookup request to the packet processor 228. The packet processor 228 then sends the post processed packets 224 to the network based on the lookup request performed by the search processors 202a-b.

Figure 2C:
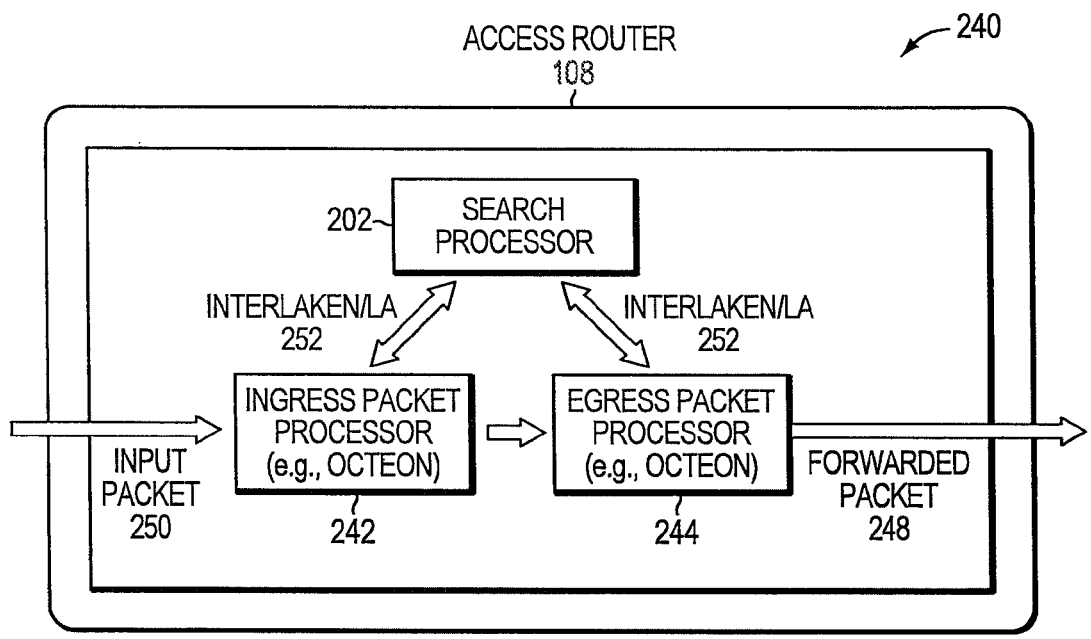

FIG. 2C is a block diagram 240 illustrating an example embodiment of the access router 108 employing the search processor 202. The access router 108 receives an input packet 250 at an ingress packet processor 242. The ingress packet processor 242 then forwards a lookup request with a packet header of the input packet 250 to the search processor 202. The search processor 202 determines, based on packet header of the lookup request, a forwarding path for the input packet 250 and responds to the lookup requests over the Interlaken interface 252 to the egress packet processor 244. The egress packet processor 244 then outputs the forwarded packet 248 to the network.

FIG. 3A is a diagram 300 of an example embodiment of a router architecture. The router architecture includes a switched backplane 302 coupled with a processor card 303 that includes a processor 308 and a memory 304. The switched backplane 302 is further coupled with a plurality of line cards 306a-h. Each line card 306a-h includes a search processor as described herein.

FIG. 3B is a block diagram 320 illustrating an example embodiment of a router employing the search processor 202. The router includes the switched backplane 302 which is coupled to the line cards 306a-b and the processor card 303. The processor card 303 includes a processor 308 and a routing table 328, which can be stored in the memory 304 of the processor card 303. Each line card 306a-b includes a respective local buffer memory 322a-b, a forwarding table 324a-b, and a media access control (MAC) layer 326a-b. The search processor 202 exists within the forwarding table 324a-b of the line card 306a-b.

As an example, a packet is received by the line card 306a at the MAC layer 326a. The MAC layer 326a sends the packet to the forwarding table 324a. Then, the packet and appropriate forwarding table information is stored in the local buffer memory 322a. Based on the determination, the router selects an appropriate line card 306b, stores the packet and forwarding information in the local buffer memory 322b of the appropriate line card, and forwards the packet out to the network.

Figures 3C, 3D:
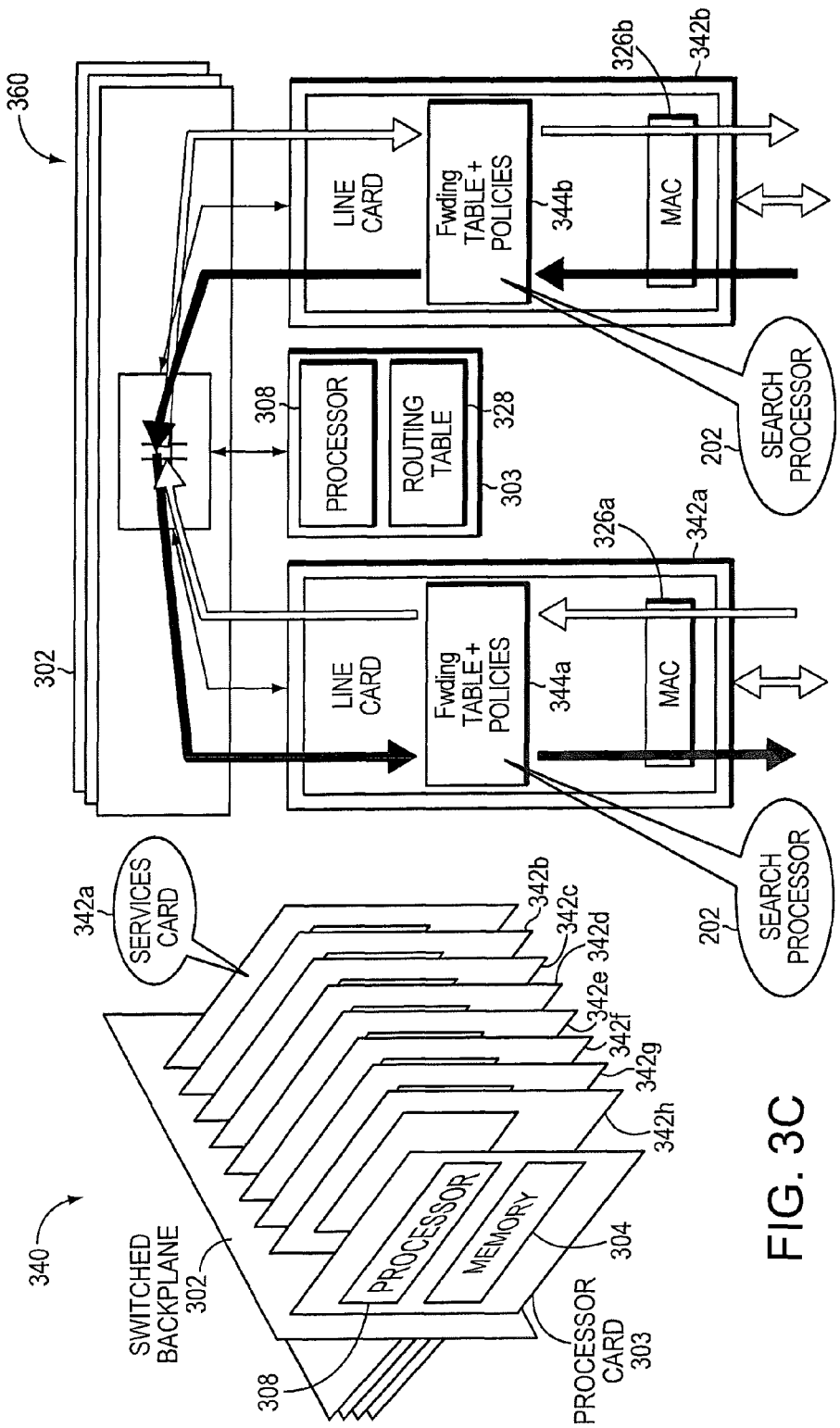
FIG. 3C is a block diagram of an example of a router including a switched backplane.
FIG. 3D is a block diagram of another example of a router employing a search processor.

FIG. 3C is a block diagram 340 of another embodiment of a router including the switched backplane 302. The switched backplane 302 is coupled to the processor card 303, the line cards 342b-h, and a services card 342a. The processor card 303 includes the memory 304 and the processor 308. The services card 342a is a type of line card 342b-h. Further, the search processor described herein can also exist on the services card 342a.

FIG. 3D is a block diagram 360 illustrating an example embodiment of a router employing the switched backplane 302. The switched backplane 302 is coupled with the processor card 303, the services card 342a and line card 342b. The line cards 342a-b can either be a services card 342a or line card 342b. The line cards 342a-b include a forwarding table and corresponding policies module 344a-b, and a MAC layer 326a-b. The search processor 202 is included in the line cards 342a-b. The line card 342a receives a packet from a network through the MAC layer 326a at the forwarding table and policies module 344a. The search processor 202 processes the packet according to the forwarding table and policies module 344a and according to the routing table 328 in the processor card 303 and forwards the packet to an appropriate line card 342b to be forwarded into the network.

Generally speaking, packets received are matched with rules that determine actions to take with a matched packet. Generic packet classification requires a router to classify a packet on the basis of multiple fields in a header of the packet. Each rule of the classifier specifies a class that a packet may belong to, according to criteria on 'F' fields of the packet header, and associates an identifier (e.g., class ID) with each class. For example, each rule in a flow classifier is a flow specification, in which each flow is in a separate class. The identifier uniquely specifies an action associated with each rule. Each rule has multiple fields. An ith field of a rule R, referred to as R[i], is a regular expression on the ith field of the packet header. A packet P matches a particular rule R if for every i, the ith field of the header of P satisfies the regular expression R[i].

Figure 4:
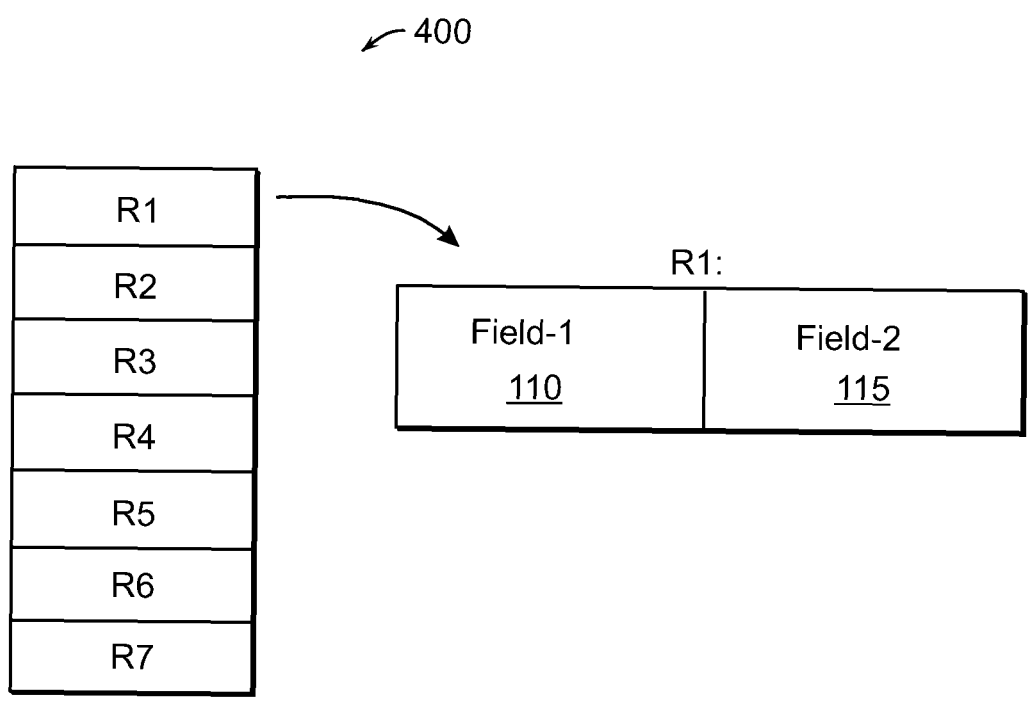
FIG. 4 is a diagram of an example of a classifier table including 2-tuple rules.

FIG. 4 shows an example classifier table 400 including rules for classifying a packet or "key." As shown, the classifier table 400 contains seven rules R1-R7 each containing two fields or "dimensions," Field-1 110, and Field-2 115. (The terms field and dimension are used interchangeably herein.) Although the table 400 shows rules being 2-tuple (e.g., containing only two fields), it should be noted that rules may contain a number of fields n and be n-tuple. Each rule specifies one or more values in each dimension (e.g., an Internet Protocol (IP) address or Layer 4 port or protocol) to be matched against a key.

Figure 5A:
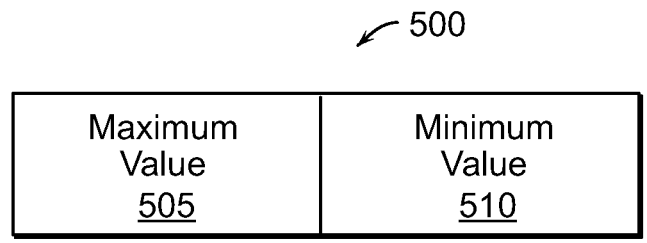
FIGS. 5A-5D are diagrams of a range field for a range match, exact match field for an exact match, prefix field for a prefix match, and mask field for a mask match, respectively.
Figure 5B:
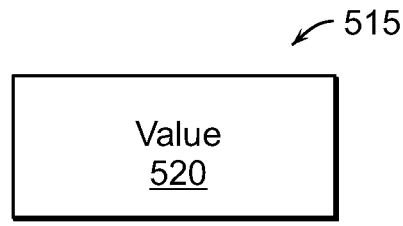

With reference to FIGS. 5A-5D, each dimension of a rule is associated with one of the following types of match: range match, exact match, prefix match, and mask match. FIG. 5A shows an example of a range field 500 for a range match. The range field 500 has a maximum value 505 and minimum value 510. The range match determines whether a given key is within the maximum value 505 and minimum value 510 as set in the range field 500. FIG. 5B shows an example of an exact match field 515 for an exact match. The exact match field 515 has a value 520. The exact match determines whether a given key exactly matches the value 520 as set in the exact match field 515.

Figure 5C:
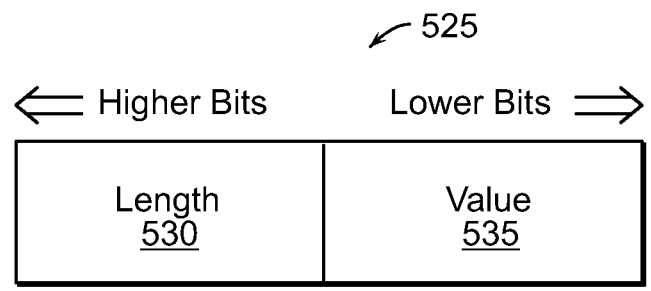
Figure 5D:

FIG. 5C shows an example of a prefix field 525 for a prefix match. The prefix field 525 includes a length 530 and value 535. The prefix match determines whether a number of bits, as set by the length 530, of the value 535 matches a first set of bits in a given key. For example, given the length 530 of eight bits, the prefix match matches a first eight bits of a key to the first eight bits of the value 535. FIG. 5D shows an example of a mask field 540 for a mask match. The mask field 540 includes a value 545 and mask 550. The mask match determines whether a given set of bits in a key, as indicated by the mask 550, matches the value 545. Collectively, the content representing these values, are referred to as "dimension data" or "dimension match data" of a rule.

Classes specified by the rules may overlap. For instance, one key may match several rules. In this case, when several rules overlap, an order in which the rules appear in the classifier may determine the relative priority of the rule. In other words, a key that matched multiple rules belongs to the class identified by the identifier (class ID) of the rule among them that appears first in the classifier. Alternatively, a unique priority associated with a rule may determine its priority, for example, the rule with the highest priority.

The search processor 202 (FIG. 2) includes a component called a rule match engine (RME). The RME matches a key against rules to find a match, if any. The RME issues rule I/O accesses to memory to retrieve rules stored in memory. In some instances, a rule is provided to the RME in portions, as described below in greater detail. The RME then analyzes the key using the retrieved rules and issues a "match" or "no-match" response depending on whether the key matches one of the retrieved rules.

Figure 6:
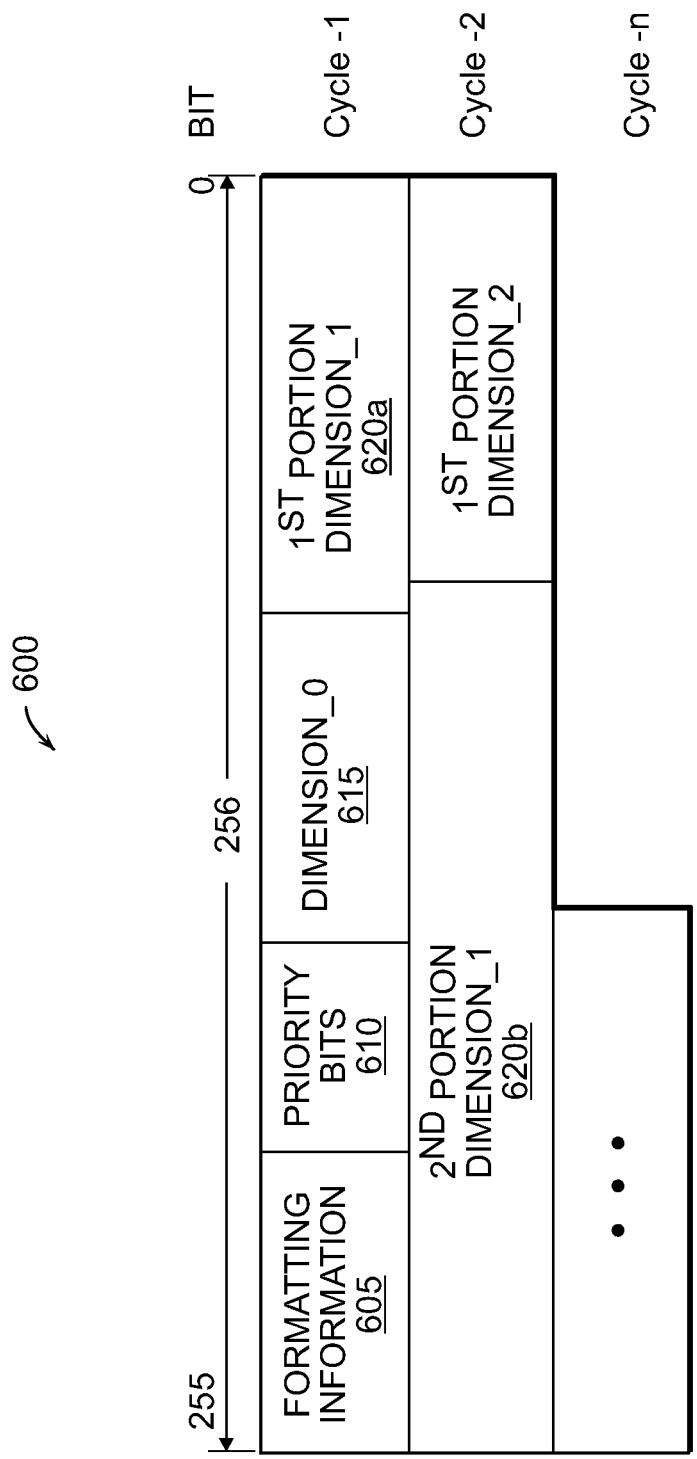
FIG. 6 is a block diagram of a rule provided to a rule match engine in portions over multiple cycles.

FIG. 6 shows an example rule 600 provided to the RME in 256-bit portions over n number of cycles. In other words, in each cycle, only 256 bits are transferred to the RME for processing. The dimensional match data of the rule 600 includes dimension_0, dimension_1, dimension_2, etc. In cycle-1, formatting information 605, priority bits 610 and dimension_0 615 are provided to the RME. As shown, dimension_1 has a bit-size greater than the remaining bits that can be transferred in cycle-1. That is, dimension_1 does not "fit" in cycle-1. Instead, a first portion of dimension_1 is provided in cycle-1 and the remaining second portion is provided in cycle-2. The rule 600 continues to be transferred to the RME across multiple cycles in this manner, as needed.

As the example of FIG. 6 demonstrates, in some cases, only a portion of the dimensional match data is provided to the RME per cycle. It may take several cycles before the RME has the dimension match data in its entirety. Accordingly, the challenge is comparing a key against a rule (more specifically, dimension match data of the rule) that is provided in multiple portions at different times.

In one approach to the challenge, the RME waits to receive all portions of the dimension match data before comparing the key to the dimension match data. This causes idle resources and wastes cycles that could be doing useful work. Even worse, a lot of additional hardware is required to handle maximum width dimension data all at once instead of an individual portion at a time. Preferably, the RME processes as much dimension match data as provided each cycle.

In another approach, according to the examples described herein, the RME performs a partial compare per cycle. In one cycle, the RME compares a portion of the dimension match data of the rule to a corresponding portion of data in the key. The RME carries the result of the comparison forward into a next cycle by setting a condition code. In the next cycle, the RME performs another partial compare with another portion of the dimension match data (e.g., the remaining portion of the dimension match data) and sets another condition code. The RME repeats until it compares all portions of the dimension match data (or in some examples, the RME repeats depending on the condition code of a prior comparison, as described below in greater detail). The RME uses the condition code(s) to determine the result of a comparison of the rule and key. Advantageously, with this "condition code" approach, the RME processes the amount of dimension match data provided to it during a given cycle. In turn, this keeps the RME at or near line rate.

Figure 7:
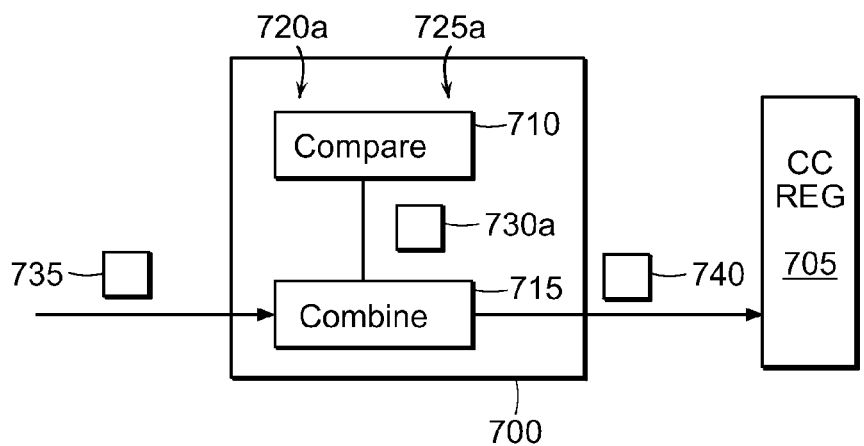
FIG. 7 is a block diagram of an example of the rule match engine.
Figure 7:
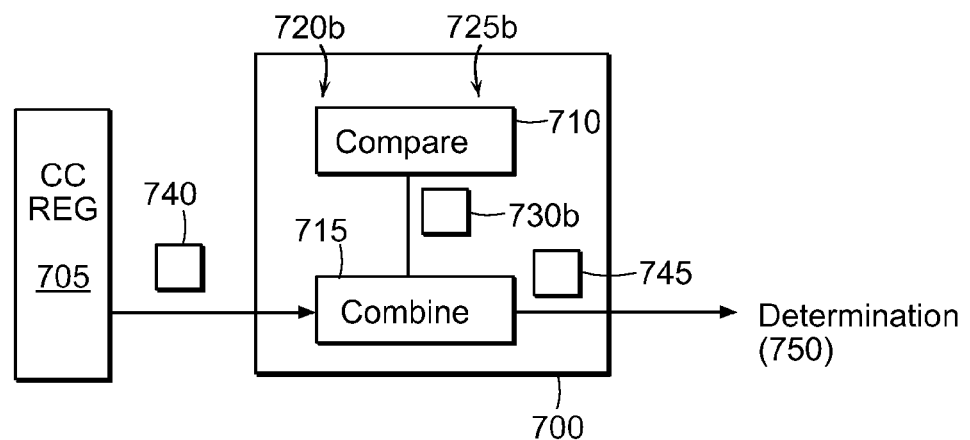

FIG. 7 shows an RME 700 performing an example of the condition code approach. The RME 700 and condition code register 705 are communicatively coupled as shown. The condition code register 705 stores condition codes set by the RME 700. The RME 700 includes a comparing block 710 and combining block 715. The comparing block 710 and combining block 715 are communicatively coupled as shown. In cycle-1 (initial cycle), the comparing block 710 compares a first portion of dimension match data of a rule 720a to a corresponding first portion of data in a key 725a. The comparing block 710 sets a condition code 730a (current condition code) to equal to (EQ), greater than (GT), or less than (LT) based on the comparison (current comparison).

The combining block 715 combines the current condition code 730a with a condition code of a prior comparison (prior condition code) 735. In the initial cycle, the prior condition code 735 is EQ by default. The combining block 715 outputs a combined condition code 740. The RME 700 stores the combined condition code 740 in the condition code register 705.

In cycle-2 (next cycle), the comparing block 710 compares a second portion of the dimension match data 720b to a corresponding second portion of the key data 725b. The comparing block 710 sets a current condition code 730b to EQ, GT, or LT based on the current comparison. As before, the combining block 715 combines the current condition code 730b with a condition code of a prior comparison. In cycle-2, the comparison code for the prior comparison is the condition code 740 from cycle-1 stored in the condition code register 705.

The RME 700 determines whether the dimension match data is equal to, greater than, or less than the corresponding data in the key based on combined condition codes 745. Based on determination 750, the RME 700 returns a response indicating whether the dimension match data and the corresponding data in the key match each other.

As the example of FIG. 7 shows, the RME 700 performs two partial compares in two cycles to compare the rule and key data that are provided to the RME 700 in two portions. The condition code approach also applies to data provided in any number of portions. It such instances, a condition code stored in the condition code register 705 is a "running condition code" keeping the status of prior comparisons.

Consider the example shown in FIG. 8, in which after partial compares in cycle-1 and cycle-2, condition codes 1-CC and 2-CC are set to EQ. The combining block 715 combines the condition codes 1-CC and 2-CC and sets a condition code for the prior comparisons (P-CC) to EQ. The combining block 715 stores the condition code P-CC in the condition code register 705. The stored condition code P-CC is the running condition code and tracks the status of the prior comparisons in cycle-1 and cycle-2.

In cycle-3, the comparing block 710 performs another partial compare and sets a condition code for the current comparison (3-CC). The combining block 715 combines the condition code 3-CC with the condition code P-CC and makes a determination of GT, as shown.

The operation of the combining block 715 (FIG. 7) is described in more detail with reference to FIGS. 9A-9E. In the examples shown in FIGS. 9A and 9B, after the partial compare of data portions in cycle-1, the comparing block 710 (FIG. 7) sets the condition codes (1-CC) of LT and GT, respectively. When the result of a partial compare is either less than or greater than, results of subsequent partial compares do not change that result. (Shown in the figures as "—don't care bits.")

In a convenient example of the condition code approach, the RME 700 (FIG. 7) determines whether to compare another portion (e.g., a second portion) of dimension match data with a corresponding portion of key data based on the condition code set in a prior partial compare (e.g., in an initial partial compare). The RME then compares (e.g., in a next partial compare) portions of the dimension match data and key data based on the determination.

In another example of the condition code approach, the RME 700 (FIG. 7) compares another portion (e.g., a second portion) of dimension match data with a corresponding portion of key data independent of a condition code set in a prior partial compare (e.g., in an initial comparison). This example is particular advantageous in hardware solutions because it does not require additional logic to conditionally schedule and perform the second partial compare.

Continuing with reference to the examples shown in FIGS. 9C-9E, after partial compares in cycle-1, the condition codes (1-CC) are set to EQ. When the result of a partial compare is equal to and there are more data portions to compare, subsequent partial compares are needed to determine the result. As shown in FIG. 9C, in cycle-2, the combining block 715 combines a current condition code (2-CC) of LT and a prior condition code (1-CC) of EQ from cycle-1 resulting in a determination of LT. As shown in FIG. 9D, in cycle-2, the combining block 715 combines a current condition code (2-CC) of GT and a prior condition code (1-CC) of EQ from cycle-1 resulting in a determination of GT. As shown in FIG. 9E, in cycle-2, the combining block 715 combines a current condition code (2-CC) of EQ and a prior condition code (1-CC) of EQ from cycle-1 resulting in a determination of EQ.

According to a convenient example of the condition code approach shown in FIG. 10, a condition code 1000 is represented by a first bit 1005 and second bit 1010. For convenience, the first bit 1005 may be referred to as an "equal to" bit and the second bit 1010 may be referred to as a "less than" bit. The RME 700 (FIG. 7) sets the condition code 1000 to EQ, LT, or GT by setting the first and second bits (1005, 1010) to the values shown in the figure. Some examples of the condition code approach use condition codes having more than two bits, depending on the application.

FIGS. 11A-C show an example of the condition code approach in which dimension match data of a range match, minimum and maximum values, are interleaved. (Range match is described above with the reference to FIG. 5A.) With the reference to FIG. 11A, a range match 1100 includes an eight-bit minimum value 1105 and an eight-bit maximum value 1110. The minimum and maximum values (1105, 1110) are each written in binary from left to right, from high bit (7) to low bit (0). As shown, the four high bits (bits 7-4) of the minimum and maximum values are interleaved; and the four low bits (bits 3-0) of the minimum and maximum values are interleaved forming an interleaved value 1115.

The interleaved value 1115 is provided to the RME 700 (FIG. 7) in a first portion and a second portion. Because of interleaving, the first portion of the interleaved value 1115 includes the four high bits of the minimum value and four high bits of the maximum value, referenced in FIG. 11B as "1-Rule Data-LO" and "1-Rule Data-HI," respectively.

Similarly, the second portion of the interleaved value 1115 includes the four low bits of the minimum value and four low bits of the maximum value, referenced in FIG. 11C as "2-Rule Data-LO" and "2-Rule Data-HI," respectively.

With reference to FIG. 11B, in cycle-1, the RME compares the four high bits of the minimum value (1-Rule Data-LO) and the four high bits of the maximum value (1-Rule Data-HI) to a corresponding portion of data in the key (1120a). Based on the comparisons, the RME sets a first condition code for the four high bits of the minimum value (1-CC-LO) to EQ and sets a first condition code for the four high bits of the maximum value (1-CC-HI) to EQ.

With reference to FIG. 11C, in cycle-2, the RME compares the four low bits of the minimum value (2-Rule Data-LO) and the four low bits of the maximum value (2-Rule Data-HI) to a corresponding portion of data in the key (1120b). Based on the comparisons, the RME sets a second condition code for the four low bits of the minimum value (2-CC-LO) to LT and sets a second condition code for the four low bits of the maximum value (2-CC-HI) to EQ.

As shown, the RME, determines whether the key is within the minimum and maximum values of the range match based on the first and second condition codes for the minimum value (1-CC-LO AND 2-CC-LO); and the first and second condition codes for the maximum value (1-CC-HI AND 2-CC-HI).

FIG. 12 shows an example of the condition code approach applied to a mask match 1200. (Mask match is described above with the reference to FIG. 5D.) The dimension match data of the mask match 1200 includes a value 1205 and mask 1210. As shown, the mask 1210 has eight bits. The six left bits of the mask 1210 determine whether the six left bits of the key matches the six left bits of the value. The two right bits of the mask 1210 do not determine a match and, as such, the two right bits of the value 1205 are referred to as "don't care" bits when the mask 1210 is applied to the value 1205.

The dimension match data (value 1205 and mask 1210) and key data 1215 are provided to the RME in respective first portions and second portions. In cycle-1, the first portion of the mask 1210a identifies that the four left bits of the first portion of the value 1205a are used to match against the first portion of the key data 1215a. The RME applies the first portion of the mask 1210a to the first portion of the value 1205a and to the first portion of the key data 1215a resulting in a masked first portion of the value 1220a and a masked first portion of the key data 1225a, respectively, as shown.

The RME compares the masked first portion of the value 1220a to the masked first portion of the key data 1225a. The RME sets a condition code for the partial compare of cycle-1 (1-CC) to equal to (EQ) or not equal to (!EQ) based on the comparison. In the example of FIG. 12, the RME sets the condition code 1-CC to EQ.

In cycle-2, the second portion of the mask 1210b identifies that the two left bits of the second portion of the value 1205b are used to match against the second portion of the key data 1215b. The two right bits of the second portion of the value 1205b are "don't care" bits. The RME applies the second portion of the mask 1210b to the second portion of the value 1205b and to the second portion of the key data 1215b resulting in a masked second portion of the value 1220b and a masked second portion of the key data 1225b, respectively, as shown.

The RME compares the masked second portion of the value 1220b to the masked second portion of the key data 1225b. The RME sets a condition code for the partial compare in cycle-2 (2-CC) to equal to (EQ) or not equal to (!EQ) based on the comparison. In the example of FIG. 12, the RME sets the condition code 2-CC to EQ.

The RME combines the condition codes 1-CC and 2-CC and the RME makes a determination 1230 based on the combination in a manner similar to the other examples of the condition code approaches described above. In the example of FIG. 12, makes the determination 1230 of EQ, i.e., the masked value and masked key data are equal, and returns a match response.

The foregoing application of the condition code to a mask match also applies to prefix and exact matches. (Prefix match and exact match are described above with the reference to FIGS. 5B and 5C, respectively). A prefix match of length N is equivalent to a mask match with the N left bits determining a match (e.g., bits set to 1) and the remaining bits not determining a match (e.g., bits set to zero). As such, the example of FIG. 12 is also an example of the condition code approach applied to a prefix match of length six. An exact match of length N is equivalent to a prefix match of length N. As such, the example of FIG. 12 is also an example of the condition code approach applied an exact match of length six.

The above-described methods and systems can be implemented in digital electronic circuitry, in computer hardware, firmware, and/or software. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one example, a computer program can be written in any form of programming language, including compiled and/or interpreted languages, and the computer program can be deployed in any form, including as a stand-alone program or as a subroutine, element, and/or other unit suitable for use in a computing environment to carry out the features and functions of various examples discussed herein. A computer program can be deployed to be executed on one computer or on multiple computers at one site.

Method steps or operations can be performed as processes by one or more programmable processors executing a computer program to perform functions of various examples by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implements that functionality.

The rule match engine (RME) 700 of FIG. 7 may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks). The memory may be a tangible non-transitory computer-readable storage medium having computer-readable instructions stored therein for processing images, which when executed by one or more processors (e.g., the RME 700 of FIG. 7) cause the one or more processors to carry out or implement the features and functionalities of various examples discussed herein.

Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described systems and techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device may include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., INTERNET EXPLORER® available from Microsoft Corporation, of Redmond, Wash.). The mobile computing device includes, for example, a BLACKBERRY® provided by Research In Motion Limited of Waterloo, Ontario, Canada.

"Comprise," "include," and/or plural forms of each are open ended and include the listed parts and can include additional parts that are not listed. "And/or" is open ended and includes one or more of the listed parts and combinations of the listed parts.

Although the above disclosure discusses what is currently considered to be a variety of useful examples, it is to be understood that such detail is solely for that purpose, and that the appended claims are not limited to the disclosed examples, but, on the contrary, are intended to cover modifications and equivalent arrangements that are within the spirit and scope of the appended claims.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for comparing dimension match data of a rule with corresponding data in a packet, the method comprising:
in a rule match engine (RME) provided with dimension match data divided into a first portion and a second portion, the first portion of the dimension match data provided in a first cycle of the RME and the second portion provided in a second cycle of the RME: in the first cycle of the RME, comparing the first portion of the dimension match data with a corresponding first portion of data in a packet;
in the first cycle of the RME, setting a first condition code to equal to, greater than, or less than based on the comparison of the first portion of the dimension match data with the corresponding first portion of data in the packet;
in the second cycle of the RME, comparing the second portion of the dimension match data with a corresponding second portion of data in the packet;
in the second cycle of the RME, setting a second condition code to equal to, greater than, or less than based on the comparison of the second portion of the dimension match data with the corresponding second portion of data in the packet;
determining whether the dimension match data is equal to, greater than, or less than the corresponding data in the packet based on the first and second condition codes, the determination being a combined result of the RME partially comparing the dimension match data with the packet as each portion of the dimension match data is provided to the RME over multiple cycles; and returning a response indicating whether the dimension match data and the corresponding data in the packet match based on the determination, and the response causing an action to be taken on the packet by a network service.

2. The method of claim 1, given a minimum value and a maximum value of a range match are interleaved into an interleaved minimum/maximum value and the dimension match data is the interleaved minimum/maximum value, wherein comparing the first portion of the dimension match data, includes comparing the first portion of the interleaved minimum/maximum value to the corresponding first portion of data in the packet;

wherein setting the first condition code, includes setting a first condition code for the minimum value and a first condition code for the maximum value to equal to, greater than, or less than based on the comparison of the first portion of the interleaved minimum/maximum value with the corresponding first portion of data in the packet;

wherein comparing the second portion of the dimension match data, includes comparing the second portion of the interleaved minimum/maximum value to the corresponding second portion of data in the packet;

wherein setting the second condition code, includes setting a second condition code for the minimum value and a second condition code for the maximum value to equal to, greater than, or less than based on the comparison of the second portion of the interleaved minimum/maximum value with the corresponding second portion of data in the packet; and wherein the determining includes, determining whether the packet is within the minimum and maximum values of the range match based on the first and second condition codes for the minimum value and the first and second condition codes for the maximum value.

3. The method of claim 1 wherein each of the condition codes includes a first bit and a second bit; and wherein setting a respective condition code includes setting the first and second bits forming a first value, a second value different than the first value or a third value different than the first and second values; and wherein the first, second, and third values correspond to equal to, greater than, and less than comparisons, respectively.

4. The method of claim 1 wherein setting the first condition code further includes setting the first condition code to equal to, greater than, or less than based on the determination, the first condition code being a running condition code keeping a status of prior comparisons.

5. The method of claim 1 wherein comparing the second portion of the dimension match data, further includes:

determining whether to compare the second portion of the dimension match data with the corresponding second portion of data in the based on the setting of the first condition code; and comparing the second portion of the dimension match data with the corresponding second portion of data in the packet based on the determination.

6. The method of claim 1 wherein the determining includes, determining that the dimension match data and the corresponding data in the packet are equal when the first and second condition codes are set to equal.

7. The method of claim 1 wherein the determining includes, determining the dimension match data is less than the corresponding data in the packet when the first condition code is set to less than or when the first condition code is set to equal to and the second condition codes is set to less than.

8. The method of claim 1 wherein the determining includes, determining that the dimension match data is greater than the corresponding data in the packet when the first condition code is set to greater than or when the first condition code is set to equal to and the second condition codes is set to greater than.

9. The method of claim 1 further comprising, given a value and a mask of a mask match, each provided in a first portion and a second portion, applying the first portion of the mask to the first portion of the value and to the corresponding first portion of data in the packet resulting in a masked first portion of the value and a masked corresponding first portion of data in the packet, respectively;

comparing the masked first portion of the value to the masked corresponding first portion of data in the packet;

setting a first condition code to equal to or not equal to based on the comparison of the masked first portion of the value with the masked corresponding first portion of data in the packet;

applying the second portion of the mask to the second portion of the value and to the corresponding second portion of data in the packet resulting in a masked second portion of the value and a masked corresponding second portion of data in the packet, respectively;

comparing the masked second portion of the value to the masked corresponding second portion of data in the packet;

setting a second condition code to equal to or not equal to based on the comparison of the masked second portion of the value with the masked corresponding second portion of data in the;

determining whether the masked value is equal to or not equal to the masked corresponding data in the packet based on the first and second condition codes; and returning a response indicating whether the masked value and the masked corresponding data in the match based on the determination.

10. A system for comparing dimension match data of a rule with corresponding data in a packet, the system comprising:

a memory;

at least one interface for receiving dimension match data divided into a first portion and a second portion;

a rule match engine (RME) communicatively coupled to the memory and the at least one interface, the RME configured to:

in a first cycle of the RME, compare the first portion of the dimension match data with a corresponding first portion of data in a packet, the first portion of the dimension match data provided in the first cycle of the RME;

in the first cycle of the RME, set a first condition code to equal to, greater than, or less than based on the comparison of the first portion of the dimension match data with the corresponding first portion of data in the packet;

in a second cycle of the RME, compare the second portion of the dimension match data with a corresponding second portion of data in the packet, the second portion provided in the second cycle of the RME;

in the second cycle of the RME, set a second condition code to equal to, greater than, or less than based on the comparison of the second portion of the dimension match data with the corresponding second portion of data in the packet;

determine whether the dimension match data is equal to, greater than, or less than the corresponding data in the based on the first and second condition codes, the determination being a combined result of the RME partially comparing the dimension match data with the packet as each portion of the dimension match data is provided to the RME over multiple cycles; and return a response indicating whether the dimension match data and the corresponding data in the packet match based on the determination, and the response causing an action to be taken on the packet by a network service.

11. A tangible non-transitory computer-readable storage medium having computer readable instructions stored therein for comparing dimension match data of a rule with corresponding data in a packet, which when executed by a rule match engine (RME), provided with dimension match data divided into a first portion and a second portion, the first portion of the dimension match data provided in a first cycle of the RME and the second portion provided in a second cycle of the RME: in the first cycle of the RME, cause the RME to:

in the first cycle of the RME, compare the first portion of the dimension match data with a corresponding first portion of data in a packet;

in the first cycle of the RME, set a first condition code to equal to, greater than, or less than based on the comparison of the first portion of the dimension match data with the corresponding first portion of data in the;

in the second cycle of the RME, compare the second portion of the dimension match data with a corresponding second portion of data in the packet;

in the second cycle of the RME, set a second condition code to equal to, greater than, or less than based on the comparison of the second portion of the dimension match data with the corresponding second portion of data in the packet;

determine whether the dimension match data is equal to, greater than, or less than the corresponding data in the packet based on the first and second condition codes, the determination being a combined result of the RME partially comparing the dimension match data with the packet as each portion of the dimension match data is provided to the RME over multiple cycles; and return a response indicating whether the dimension match data and the corresponding data in the packet match based on the determination, and the response causing an action to be taken on the packet by a network service.

* * * * *